United States Patent
Lai et al.

(10) Patent No.: US 9,235,234 B2
(45) Date of Patent: Jan. 12, 2016

(54) DETACHING MECHANISM AND LAPTOP SHELL ASSEMBLY

(75) Inventors: Ku-Wu Lai, New Taipei (TW); Kang Wu, Taoyuan Shien (TW); Ming-Jou Chen, Taoyuan County (TW); Chen-Wen Yang, Taoyuan County (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 470 days.

(21) Appl. No.: 13/590,168

(22) Filed: Aug. 20, 2012

(65) Prior Publication Data
US 2014/0049910 A1 Feb. 20, 2014

(51) Int. Cl.
*E05C 19/00* (2006.01)
*G06F 1/16* (2006.01)
*E05C 21/00* (2006.01)

(52) U.S. Cl.
CPC ............ *G06F 1/1616* (2013.01); *G06F 1/1679* (2013.01)

(58) Field of Classification Search
USPC .............. 292/1, 42, 56, 80, 84, 87, 121, 125, 292/128, 99, 101, 106, 107, 302, 303
See application file for complete search history.

(56) References Cited

U.S. PATENT DOCUMENTS

| | | | | |
|---|---|---|---|---|
| 3,214,948 A | * | 11/1965 | Modrey | 70/99 |
| 6,327,879 B1 | * | 12/2001 | Malsom | 70/97 |
| 7,325,844 B2 | * | 2/2008 | Salice | 292/300 |
| 7,578,531 B1 | * | 8/2009 | Leontaridis | 292/11 |
| 7,690,700 B2 | * | 4/2010 | Neumann | 292/126 |

\* cited by examiner

*Primary Examiner* — Mark Williams
(74) *Attorney, Agent, or Firm* — Rabin & Berdo, P.C.

(57) ABSTRACT

A detaching mechanism includes at least one sloping portion, a groove, an elastic mechanism, and a latch portion. The sloping portion is disposed on a cover which detachably covers an outer surface of a shell. The sloping portion has a sloping surface. The groove is disposed on the shell. The latch portion is slidably received in the groove to slidably ride on the sloping surface of the sloping portion, such that the sloping portion is displaced away from the shell. The elastic mechanism connects the latch portion to the shell.

4 Claims, 7 Drawing Sheets

DETACHING MECHANISM AND LAPTOP SHELL ASSEMBLY

BACKGROUND

1. Technical Field

The present disclosure relates to detaching mechanisms. More particularly, the present disclosure relates to detaching mechanisms for laptop shell assemblies.

2. Description of Related Art

A laptop computer is a personal computer for easily carried around. Laptop computers of various appearances are found in the market today, but their appearances are not changeable by the user. In other words, once a decision to buy a laptop computer is made, the user will have no chance to change the appearance of the bought laptop computer. With the intense competition in the market, there becomes an increasing need to offer laptop computers with changeable appearances.

SUMMARY

According to one embodiment of the present invention, a detaching mechanism includes at least one sloping portion, a groove, an elastic mechanism, and a latch portion. The sloping portion is disposed on a cover which detachably covers an outer surface of a shell. The sloping portion has a sloping surface. The groove is disposed on the shell. The latch portion is slidably received in the groove to slidably ride on the sloping surface of the sloping portion, such that the sloping portion is displaced away from the shell. The elastic mechanism connects the latch portion to the shell.

According to another embodiment of the present invention, a laptop shell assembly includes a shell, a cover, at least one sloping portion, a groove, and a latch portion. The shell has an outer surface. The cover detachably covers the outer surface of the shell. The cover has an inner surface facing the outer surface of the shell. The sloping portion is disposed on the inner surface of the cover. The sloping portion has a sloping surface. The groove is disposed on the shell. The latch portion is slidably received in the groove to slidably ride on the sloping surface of the sloping portion, such that the sloping portion is displaced away from the shell.

DETAILED DESCRIPTION

Figure 1:
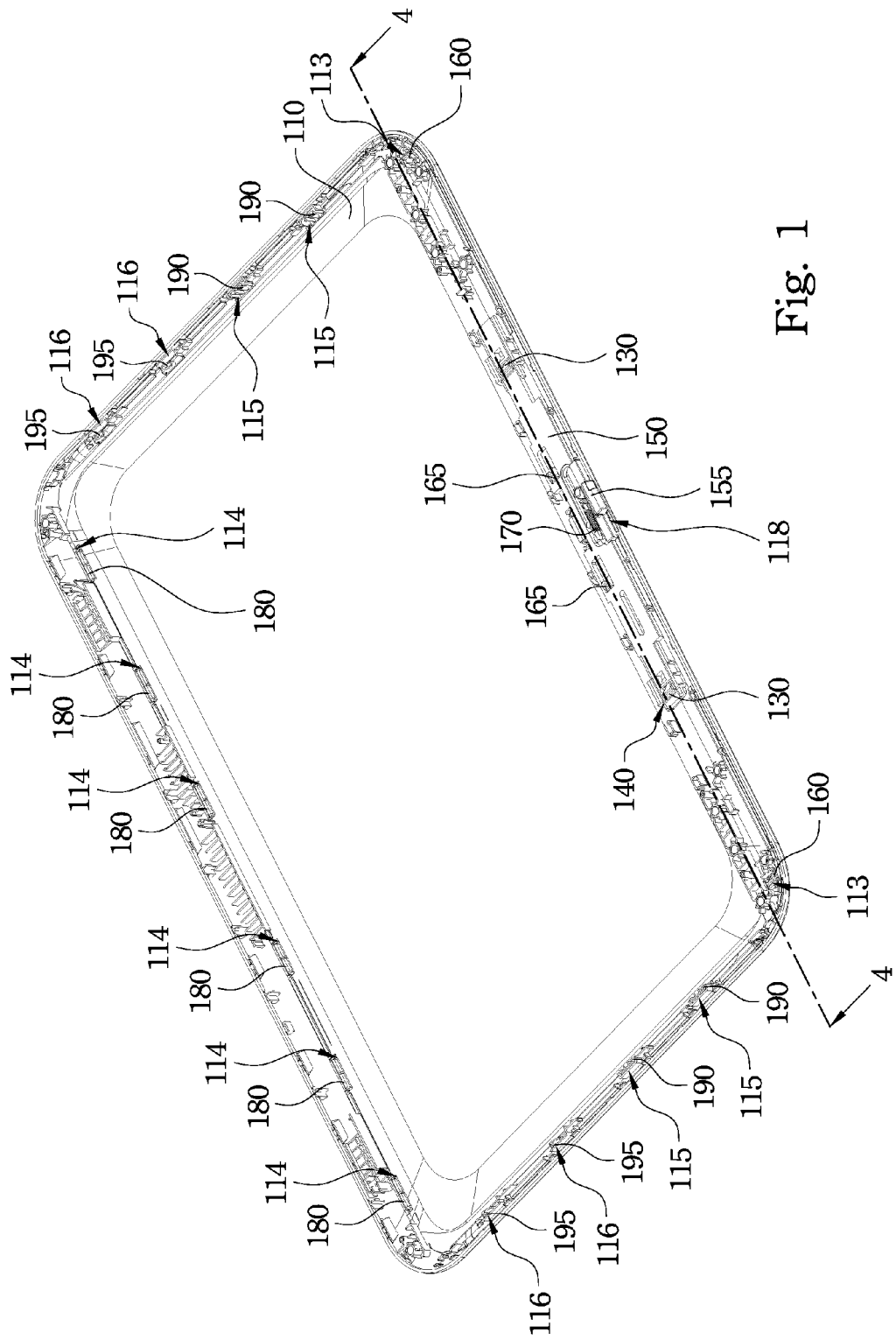
FIG. 1 is a perspective view of a laptop shell assembly according to one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The following embodiments provide a laptop shell assembly for protecting, for example, a screen of a laptop computer. The laptop shell assembly has a detachable cover. Therefore, a user may change the appearance of the laptop computer by changing the detachable cover. The details of the laptop shell assembly are provided below.

Figure 2:
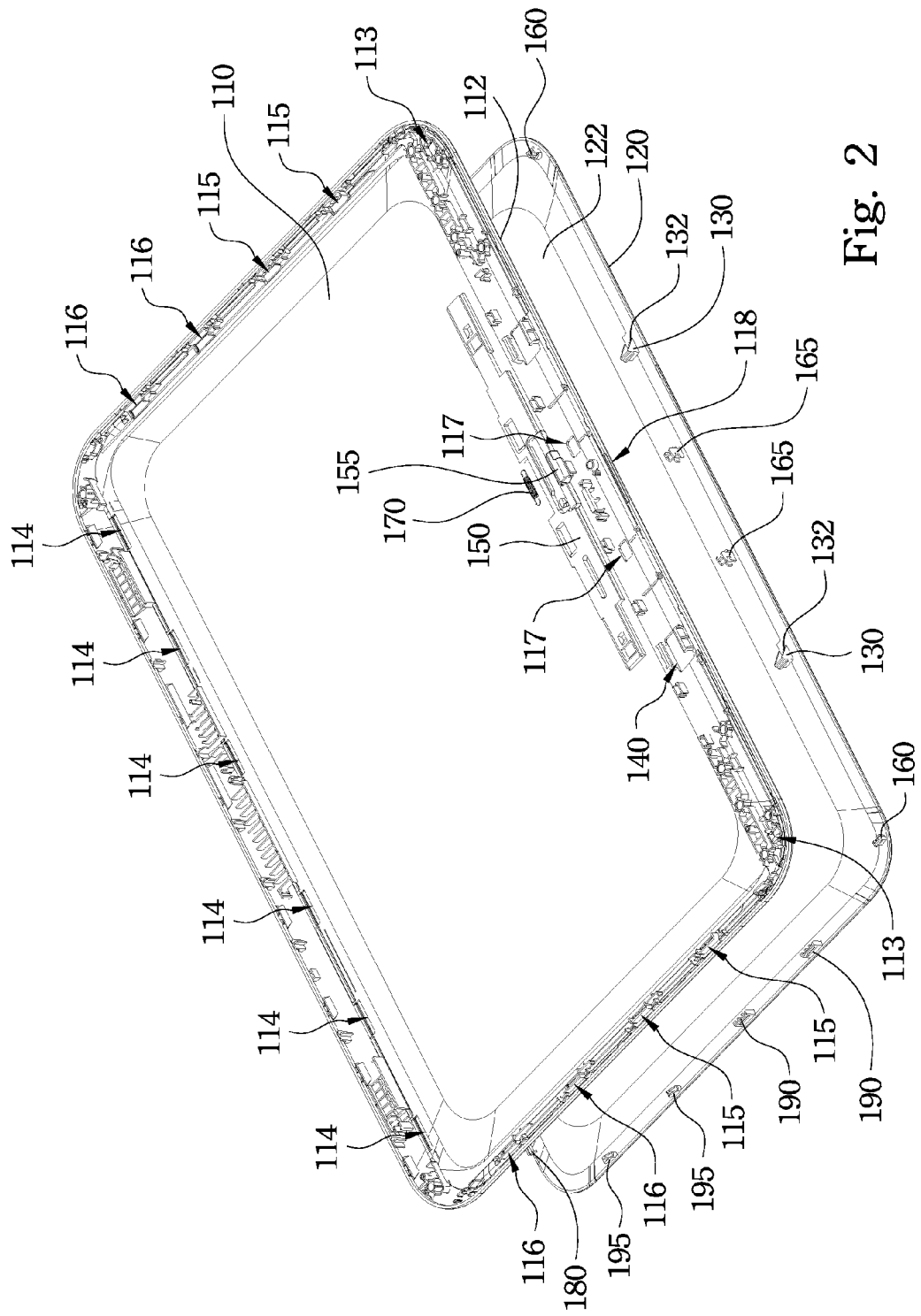
FIG. 2 is an exploded view of the laptop shell assembly of FIG. 1.
Figure 3:
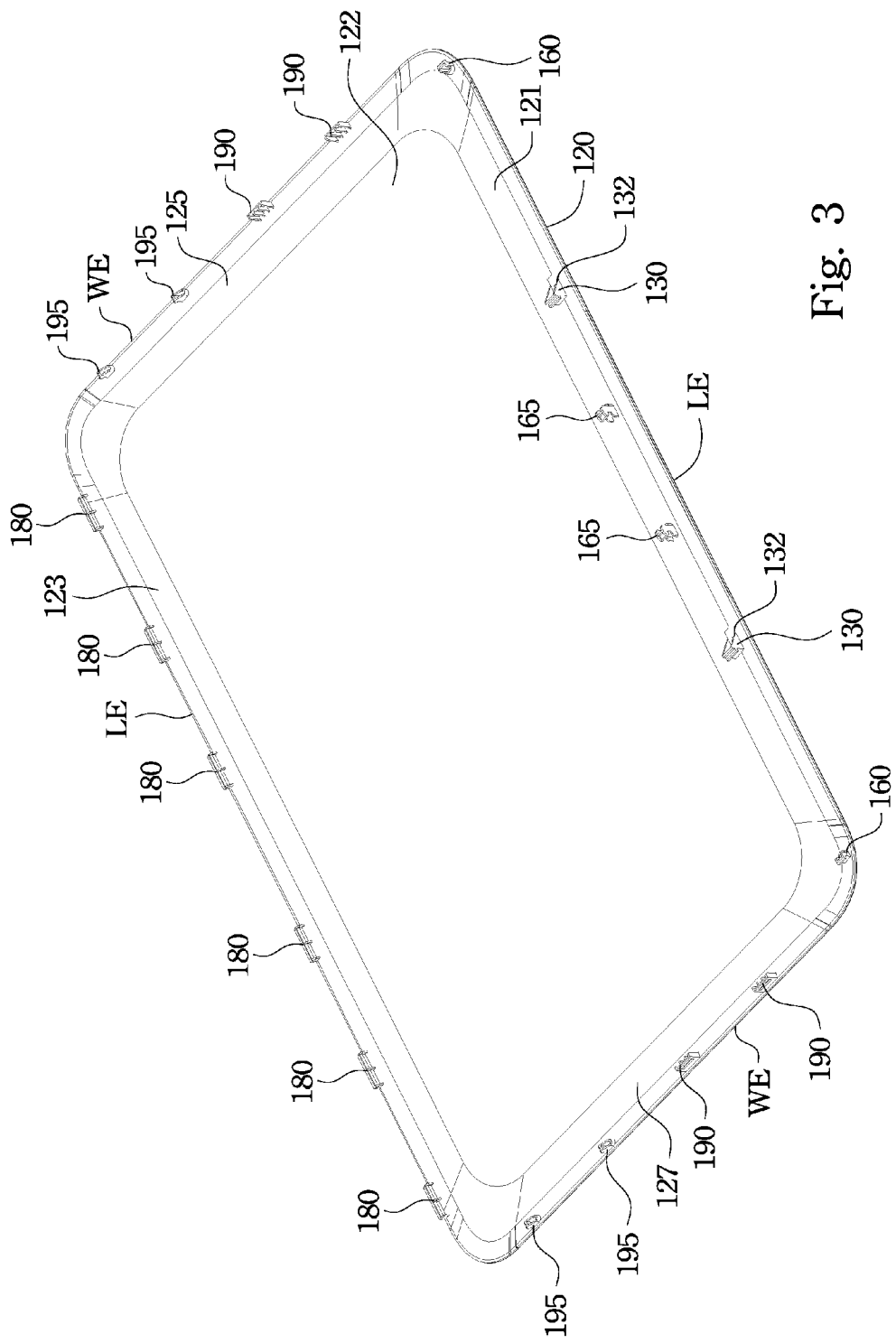
FIG. 3 is a perspective view of the cover of FIG. 1.

FIG. 1 is a perspective view of a laptop shell assembly according to one embodiment of the present invention. FIG. 2 is an exploded view of the laptop shell assembly of FIG. 1. FIG. 3 is a perspective view of the cover of FIG. 1. As shown in FIGS. 1-3, a laptop shell assembly includes a shell 110 and a cover 120. The shell 110 has an outer surface 112. The cover 120 detachably covers the outer surface 112 of the shell 110. The cover 120 has an inner surface 122 facing the outer surface 112 of the shell 110.

Figure 4:
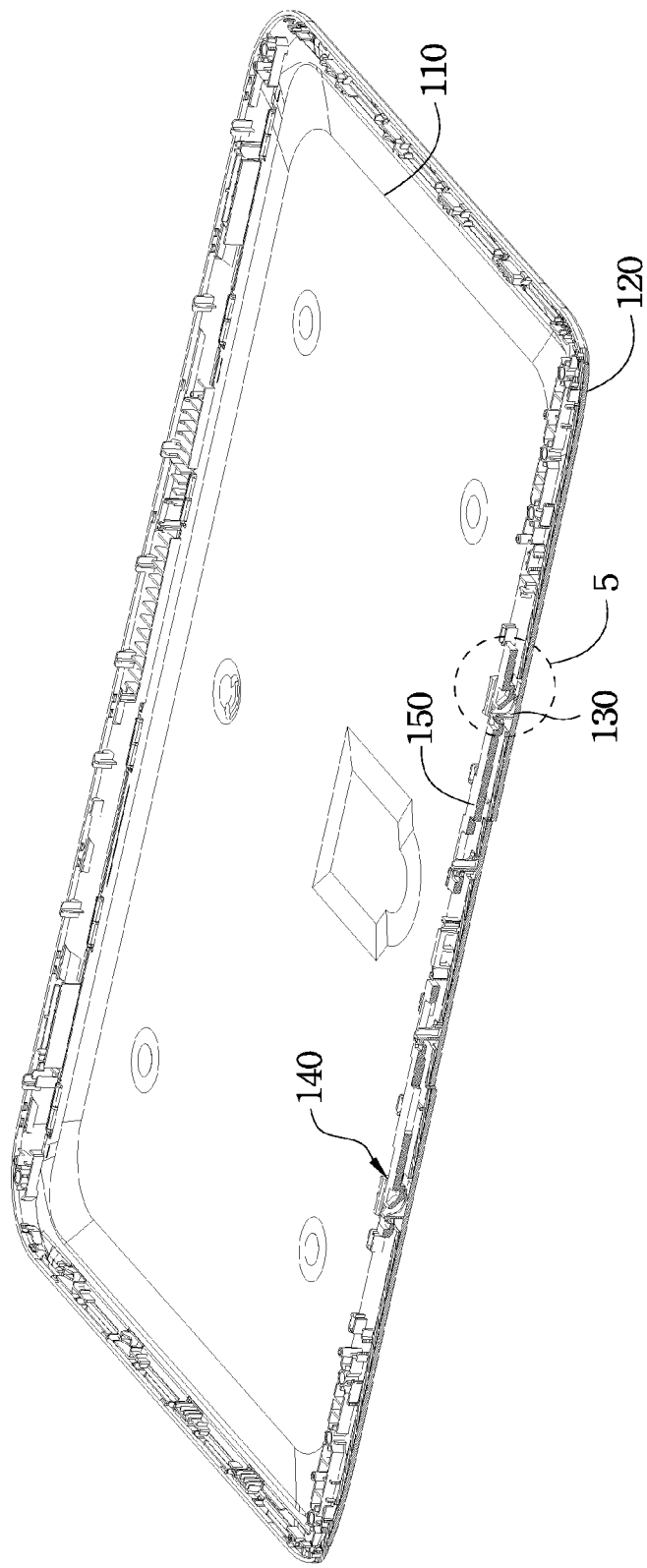
FIG. 4 is a cutaway view taken along line 4-4 of FIG. 1.
Figure 5:
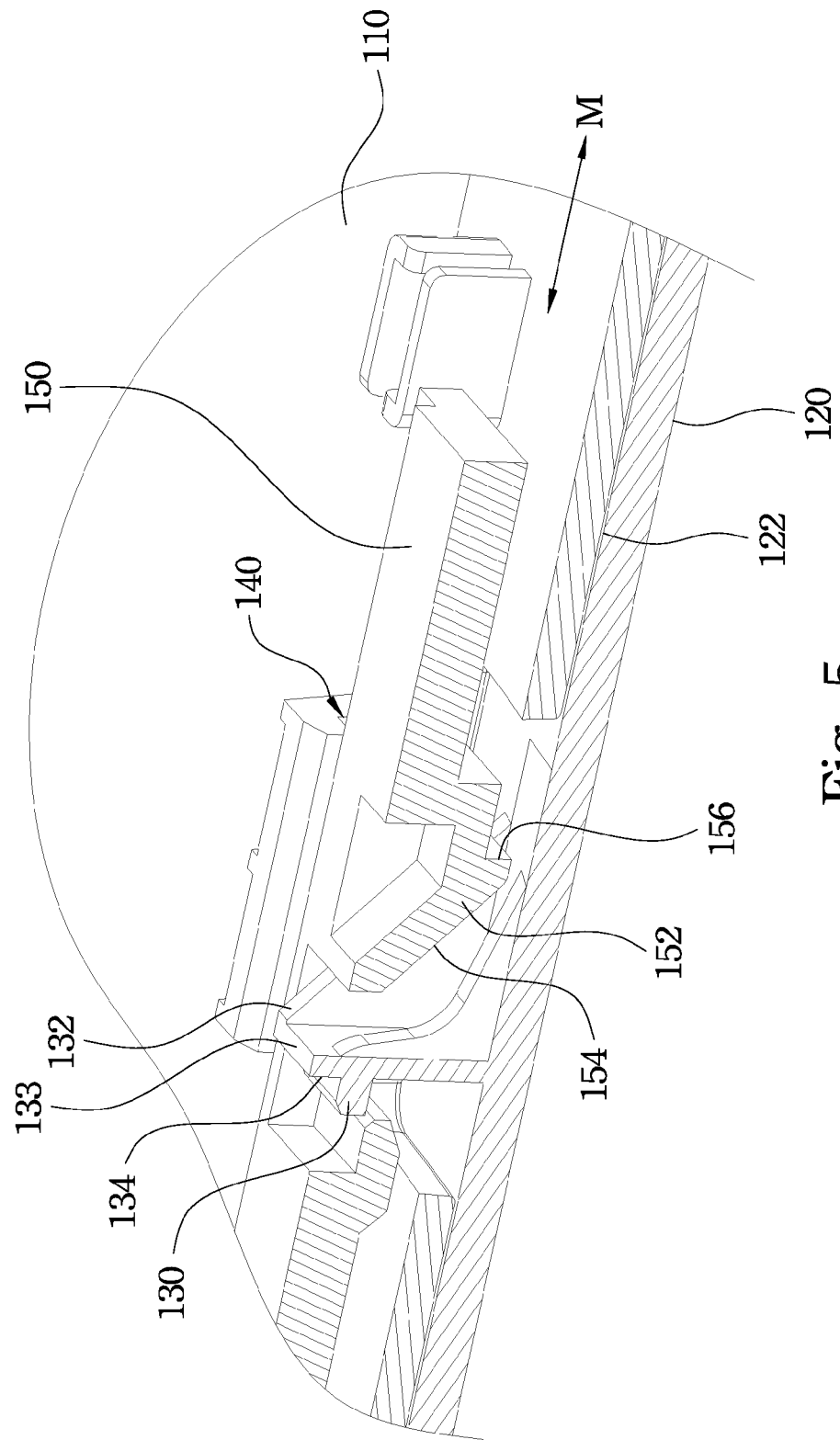
FIG. 5 is an enlarged view of region 5 of FIG. 4.

In order to detach the cover 120 from the shell 110, the laptop shell assembly may further include a detaching mechanism. FIG. 4 is a cutaway view taken along line 4-4 of FIG. 1. FIG. 5 is an enlarged view of region 5 of FIG. 4. As shown in FIGS. 4-5, the detaching mechanism includes at least one sloping portion 130, a groove 140, and a latch portion 150. The sloping portion 130 is disposed on the inner surface 122 of the cover 120. The sloping portion 130 has a sloping surface 132. The groove 140 is disposed on the shell 110. The latch portion 150 is slidably received in the groove 140.

Figure 6:
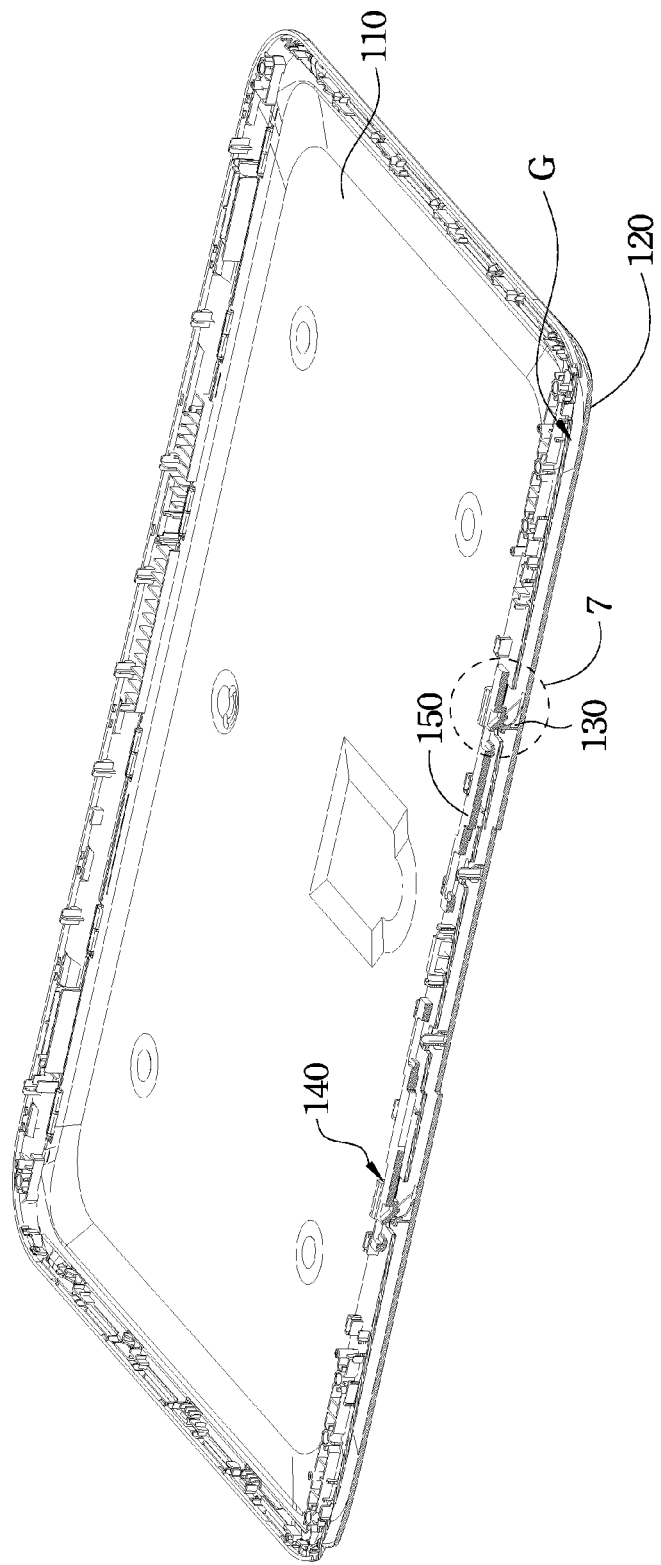
FIG. 6 is a cutaway view of the laptop shell assembly of FIG. 4 in a displaced position.
Figure 7:
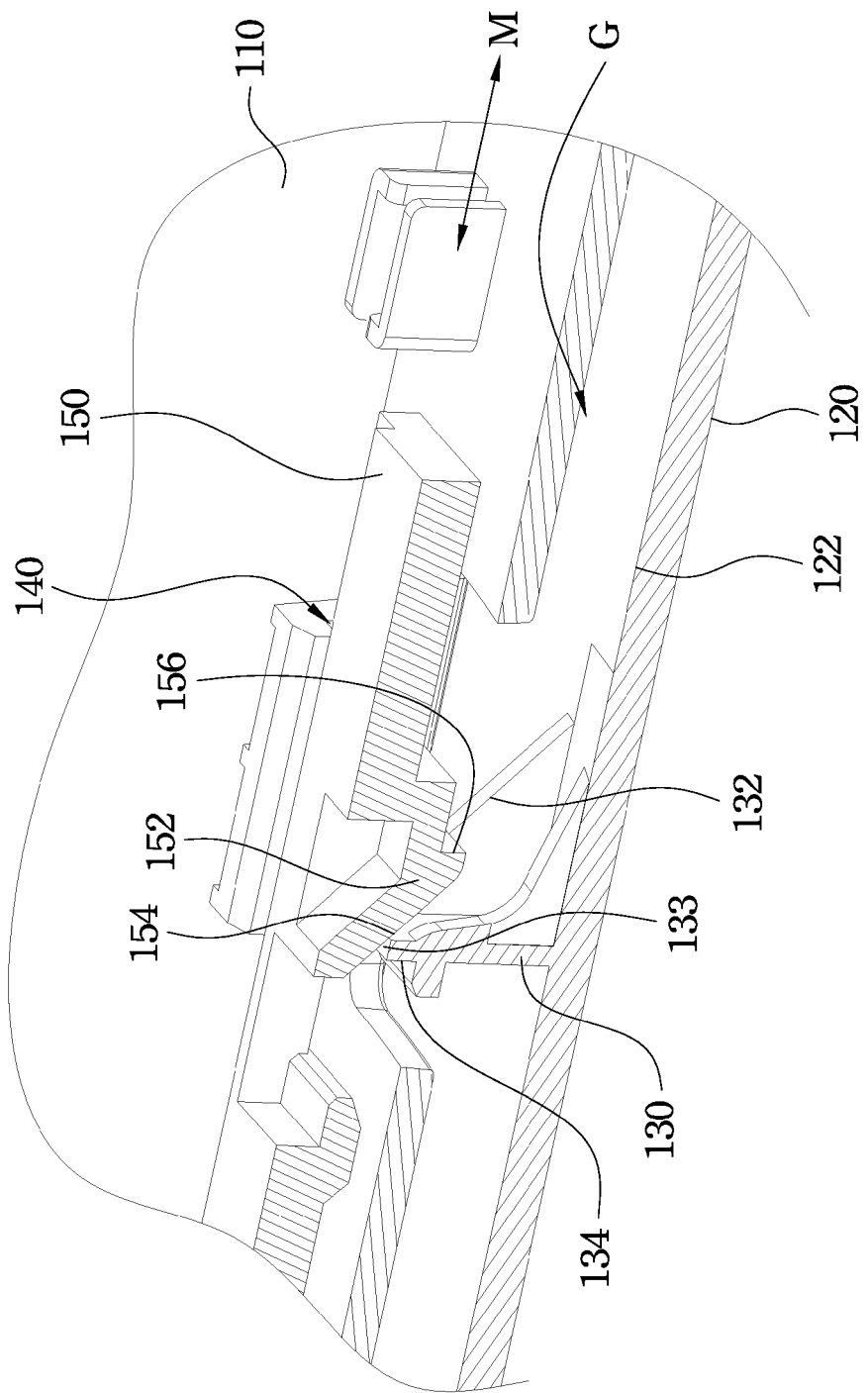
FIG. 7 is an enlarged view of region 7 of FIG. 6.

FIG. 6 is a cutaway view of the laptop shell assembly in a displaced position. FIG. 7 is an enlarged view of region 7 of FIG. 6. As shown in FIGS. 6-7, a user may slide the latch portion 150 when the user wants to detach the cover 120 from the shell 110. When the user slides the latch portion 150 to, for example, the left of the groove 140, the latch portion 150 slidably rides on the sloping surface 132 of the sloping portion 130 to displace the sloping portion 130 and the cover 120 away from the shell 110. Accordingly, a gap G is created between the cover 120 and the shell 110, and the user may detach the cover 120 from the shell 110 through the gap G.

The sloping portion 130 has a top surface 133 facing away from the cover 120. In the present embodiment, the top surface 133 of the sloping portion 130 is substantially planar, but the top surface 133 of the sloping portion 130 and the inner surface 122 of the cover 120 are non-coplanar. The sloping surface 132 of the sloping portion 130 slopes between the top surface 133 of the sloping portion 130 and the inner surface 122 of the cover 120.

The latch portion 150 has at least one protrusion 152 for slidably riding on the sloping surface 132 of the sloping portion 130. The protrusion 152 may have a sloping surface 154 for being in slidable contact with the sloping surface 132 of the sloping portion 130. More specifically, the sloping surface 154 of the protrusion 152 faces the sloping surface 132 of the sloping portion 130 and is parallel with the sloping surface 132 of the sloping portion 130.

In the case that the shell 110 and the cover 120 are large-sized, only one set of the protrusion 152 and the sloping portion 130 may not be enough to provide the gap G. In this case, the latch portion 150 may have a plurality of the protrusions 152, and a plurality of the corresponding sloping portions 130 are disposed on the inner surface 122 of the cover 120. When the user slides the latch portion 150 to, for example, the left of the groove 140, the protrusions 152 slidably ride on the sloping surfaces 132 of the sloping portions 130 respectively to create the gap G between the cover 120 and the shell 110. It is appreciated that the number of the protrusions 152 and the number of the corresponding sloping portions 130 depend on the sizes of the shell 110 and the cover 120. Although the protrusions 152 and the corresponding sloping portions 130 shown in FIGS. 4-7 are plural, the number of the protrusions 152 and the number of the corresponding sloping portions 130 should not limit the scope of the claimed invention.

Reference is made to FIGS. 1-2. The detaching mechanism may further include an elastic mechanism 170. The elastic mechanism 170 connects the latch portion 150 to the shell 110 to return the latch portion 150 to its normal position. In the embodiment shown in FIGS. 1-2, the elastic mechanism 170 is extended to store elastic potential energy when the user slides the latch portion 150 to, for example, the left of the groove 140 to detach the cover 120 from the shell 110. The elastic potential energy is released to pull the latch portion 150 back to, for example, the right of the groove 140 after the cover 120 is detached from the shell 110. In one or more embodiments, the elastic mechanism 170 may be, for example, a tensile spring.

Reference is made to FIGS. 6-7. In the case that the detaching mechanism has the elastic mechanism 170, the elastic mechanism 170 may pull the latch portion 150 back before the user detaches the cover 120 from the shell 110. In order to temporarily fix the relative position of the protrusion 152 and the sloping portion 130, the protrusion 152 may have a hook surface 156, and the sloping portion 130 may have a hook surface 134 as well. The hook surface 156 of the protrusion 152 is against the hook surface 134 of the sloping portion 130 for restraining the protrusion 152 of the latch portion 150 from moving back to the sloping surface 132 of the sloping portion 130 when the protrusion 152 of the latch portion 150 rides over the sloping surface 132 of the sloping portion 130.

In the present embodiment, the hook surface 156 of the protrusion 152 is substantially planar, and the hook surface 156 of the protrusion 152 has a normal line substantially parallel with a moving direction M of the latch portion 150. Similarly, the hook surface 134 of the sloping portion 130 is substantially planar, and the hook surface 134 of the sloping portion 130 has a normal line substantially parallel with a moving direction M of the latch portion 150. It is appreciated that the hook surfaces 156 and 134 of FIGS. 4-7 are for illustrative only and should not limit the scope of the claimed invention. In one or more embodiments, the hook surfaces 156 and 134 may be orientated in different directions than that shown in FIGS. 4-7.

Reference is made to FIGS. 1-3. The laptop shell assembly may further include at least one pair of hooks 160. The hooks 160 are disposed on the inner surface 122 of the cover 120 and face in opposite directions. The shell 110 has at least one pair of hook sockets 113. The hooks 160 are respectively engaged with the hook sockets 113. When the user slides the latch portion 150 to detach the cover 120 from the shell 110, the sloping portion 130 is displaced away from the shell 110. When the sloping portion 130 is displaced away from the shell 110, the cover 120 is bent by the displacement of the sloping portion 130. In the meantime, the hooks 160 are displaced by the bending of the cover 120 to release the engagements of the hooks 160 and the hook sockets 113.

Reference is made to FIG. 3. The cover 120 has a first side portion 121. The hooks 160 and the sloping portion 130 are all disposed on the first side portion 121.

Furthermore, the cover 120 has a second side portion 123 opposite the first side portion 121. The laptop shell assembly further includes at least one insert flap 180. The insert flap 180 extends outwardly from the second side portion 123 of the cover 120. As shown in FIGS. 1-2, the shell 110 has at least one flap hole 114, and the insert flap 180 is inserted into the flap hole 114. It is appreciated that the number of the insert flaps 180 and the number of the corresponding flap holes 114 depend on the sizes of the shell 110 and the cover 120. Although the insert flaps 180 and the corresponding flap holes 114 shown in FIGS. 1-3 are plural, the number of the insert flaps 180 and the number of the corresponding flap holes 114 should not limit the scope of the claimed invention.

Specifically, the cover 120 of FIG. 3 has opposite lengthwise edges LE and opposite widthwise edges WE. Each of the lengthwise edges LE is longer than each of the widthwise edges WE. The first side portion 121 and the second side portion 123 are adjacent to the lengthwise edges LE respectively. It is appreciated that the locations of the sloping portion 130, the hooks 160, and the insert flap 180 are for illustrative only and should not limit the scope of the claimed invention. In another one or more embodiments, the first side portion 121 where the sloping portion 130 and the hooks 160 are located and the second side portion 123 where the insert flap 180 are located may be adjacent to the widthwise edges WE respectively.

Reference is made to FIG. 3. The laptop shell assembly may further include at least one insert pin 190. The insert pin 190 stands upright on the inner surface 122 of the cover 120. As shown in FIGS. 1-2, the shell 110 has at least one pin hole 115, and the insert pin 190 is inserted into the pin hole 115. It is appreciated that the number of the insert pins 190 and the number of the corresponding pin holes 115 depend on the sizes of the shell 110 and the cover 120. Although the insert pins 190 and the corresponding pin holes 115 shown in FIGS. 1-3 are plural, the number of the insert pins 190 and the number of the corresponding pin holes 115 should not limit the scope of the claimed invention.

Furthermore, the cover 120 has a third side portion 125 and a forth side portion 127 opposite the third side portion 125. The insert pins 190 are disposed on the third side portion 125 and the forth side portion 127 respectively. As shown in FIG. 3, the third side portion 125 and the forth side portion 127 are adjacent to the widthwise edges WE respectively. It is appreciated that the locations of the insert pins 190 are for illustrative only and should not limit the scope of the claimed invention. In another one or more embodiments, the third side portion 125 and the forth side portion 127 where the insert pins 190 are located may be adjacent to the lengthwise edges LE respectively.

Reference is made to FIG. 3. The laptop shell assembly may further include at least one insert hook 195. The insert hook 195 is disposed on the inner surface 122 of the cover 120 and faces in the same direction as the extending direction of the insert flap 180. As shown in FIGS. 1-2, the shell 110 has at least one insert hook hole 116, and the insert hook 195 is inserted into the insert hook hole 116. It is appreciated that the number of the insert hooks 195 and the number of the corresponding insert hook holes 116 depend on the sizes of the shell 110 and the cover 120. Although the insert hooks 195 and the corresponding insert hook holes 116 shown in FIGS. 1-3 are plural, the number of the insert hooks 195 and the number of the corresponding insert hook holes 116 should not limit the scope of the claimed invention.

As shown in FIG. 3, the insert hooks 195 are disposed on the third side portion 125 and the forth side portion 127 respectively. More specifically, each of the third side portion 125 and the forth side portion 127 has distal and proximal portions that are respectively distal and proximal to the first side portion 121. The insert hooks 195 are disposed on the distal portions of the third side portion 125 and the forth side portion 127, and the insert pins 190 are disposed on the proximal portions of the third side portion 125 and the forth side portion 127. It is appreciated that the locations of the insert hooks 195 and the insert pins 190 are for illustrative only and should not limit the scope of the claimed invention.

Reference is made to FIG. 3. The laptop shell assembly may further include at least one auxiliary hook 165. The auxiliary hook 165 is disposed on the inner surface 122 of the cover 120. As shown in FIGS. 1-2, the shell 110 has at least one auxiliary hook hole 117, and the auxiliary hook 165 is inserted into the auxiliary hook hole 117. It is appreciated that the number of the auxiliary hooks 165 and the number of the corresponding auxiliary hook holes 117 depend on the sizes of the shell 110 and the cover 120. Although the auxiliary hooks 165 and the corresponding auxiliary hook holes 117 shown in FIGS. 1-3 are plural, the number of the auxiliary hooks 165 and the number of the corresponding auxiliary hook holes 117 should not limit the scope of the claimed invention.

As shown in FIG. 3, the auxiliary hooks 165 are disposed on the first side portion 121 and between the sloping portions 130. It is appreciated that the locations of the auxiliary hooks 165 are for illustrative only and should not limit the scope of the claimed invention.

Reference is made to FIGS. 1-2. The shell 110 has a knob opening 118 therein. The detaching mechanism further includes a knob 155. The knob 155 is exposed from the knob opening 118 of the shell 110 and connected to the latch portion 150. In use, the user may slide the knob 155 to, for example, the left of the knob opening 118 to detach the cover 120 from the shell 110. The stroke of the knob 155 depends on the sizes of the groove 140 and the knob opening 118. In one or more embodiments, the stroke of the knob 155 may be about 2.5-4.5 mm.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims is not intended to invoke the provisions of 35 U.S.C. §112, 6th paragraph.

What is claimed is:

1. A detaching mechanism comprising:
   a rib having a first sloping surface;
   at least one bracket having a groove;
   a pushing bar slidably received in the groove to be slidable on the bracket, and the pushing bar having an opening and a second sloping surface facing the opening; and
   an elastic mechanism for elastically connecting the pushing bar to a shell,
   wherein, when the rib is disposed in the opening, the elastic mechanism pulls the pushing bar to detachably lock the rib in a first direction so that the rib is fixed on the pushing bar,
   when the pushing bar is slid in the groove in a second direction to slidably ride on the first sloping surface of the rib, the pushing bar unlocks the rib, and the second sloping surface of the pushing bar pushes the first sloping surface of the rib to leave the opening towards a third direction for detaching the rib from the pushing bar,
   wherein the second direction is opposite to the first direction, and the third direction is perpendicular to the first direction.

2. The detaching mechanism of claim 1, wherein the rib has a top surface and a bottom portion, and the first sloping surface of the rib slopes between the top surface and the bottom portion thereof.

3. The detaching mechanism of claim 1, wherein the pushing bar includes at least one protrusion having the second sloping surface.

4. The detaching mechanism of claim 3, wherein the protrusion has a first hook surface, the rib has a second hook surface,
   when the protrusion of the pushing bar rides over the first sloping surface of the rib, the first hook surface of the protrusion is against the second hook surface of the rib for stopping the protrusion of the pushing bar from moving in the first direction.

* * * * *